US006821062B2

(12) United States Patent
Hockauf et al.

(10) Patent No.: US 6,821,062 B2
(45) Date of Patent: Nov. 23, 2004

(54) DEVICE FOR PROCESSING A WORKPIECE

(75) Inventors: Wolfgang Hockauf, Aspach-Rietenau (DE); Mike Roger Girguis, Wolfsburg (DE); Alexander Stoll, Bergisch Gladbach (DE); Josef Steibl, Unterschleissheim (DE); Eckart Schillo, Eching (DE); Reinhard Schirsch, Pasewalk (DE); Waldemar Zielasko, Kirchheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/438,547

(22) Filed: May 15, 2003

(65) Prior Publication Data

US 2004/0005202 A1 Jan. 8, 2004

Related U.S. Application Data

(63) Continuation of application No. 10/245,969, filed on Sep. 18, 2002, now abandoned.

(30) Foreign Application Priority Data

Sep. 18, 2001 (DE) ........................................ 101 45 921

(51) Int. Cl.[7] .......................... B23Q 11/02; B23Q 11/08

(52) U.S. Cl. ....................... 408/137; 409/134; 451/456; 144/252.1

(58) Field of Search ................................ 409/137, 134; 451/456, 451; 29/DIG. 83, DIG. 86, DIG. 94; 144/252.1

(56) References Cited

U.S. PATENT DOCUMENTS 1,047,571 A * 12/1912 Sadler ........................ 451/455
3,808,750 A * 5/1974 Mann ......................... 451/456
4,514,936 A * 5/1985 Hurtado ...................... 409/137
5,544,986 A * 8/1996 Kudo et al. ................. 409/137
5,653,623 A * 8/1997 Kimura et al. .............. 451/456
5,713,785 A * 2/1998 Nishio ....................... 451/456
6,071,047 A * 6/2000 Nakai ......................... 409/131
6,120,222 A * 9/2000 Hiramoto et al. ........... 409/137
6,164,881 A * 12/2000 Shono ........................ 409/137
6,206,621 B1 * 3/2001 Sebring ...................... 409/137
6,210,085 B1 * 4/2001 Haninger .................... 409/137
6,210,086 B1 * 4/2001 Lecornet et al. ............ 409/137

FOREIGN PATENT DOCUMENTS

| | | |
|---|---|---|
| DE | 40 02 568 | 8/1991 |
| DE | 42 18 247 | 12/1992 |
| DE | 44 39 114 | 5/1996 |
| DE | 196 51 662 | 6/1998 |
| DE | 197 34 628 | 2/1999 |
| DE | 197 34 631 | 2/1999 |
| DE | 299 00 106 | 7/1999 |
| EP | 51 06 37 | 10/1992 |
| WO | WO 93/16334 | 8/1993 |

* cited by examiner

*Primary Examiner*—A. L. Wellington
*Assistant Examiner*—Dana Ross
(74) *Attorney, Agent, or Firm*—Kenyon & Kenyon

(57) ABSTRACT

A device for processing a workpiece which, for this purpose, is fixed inside a working space (or enclosure) in a machining center and is processed with the aid of a tool. To remove processing residues, a gas stream is made to flow through working space, which is formed, for this purpose, like a nozzle. So as to improve further the removal of undesired processing residues from working space, without at the same time increasing the performance of the devices generating air stream, the working space is widened after the narrowest cross sectional area, in the flow direction of gas stream, similar to a Laval nozzle, machining center being situated in the region of the greatest flow speed. Because of this arrangement, in addition, an undesired limitation of working space available for machining center may be avoided.

15 Claims, 1 Drawing Sheet

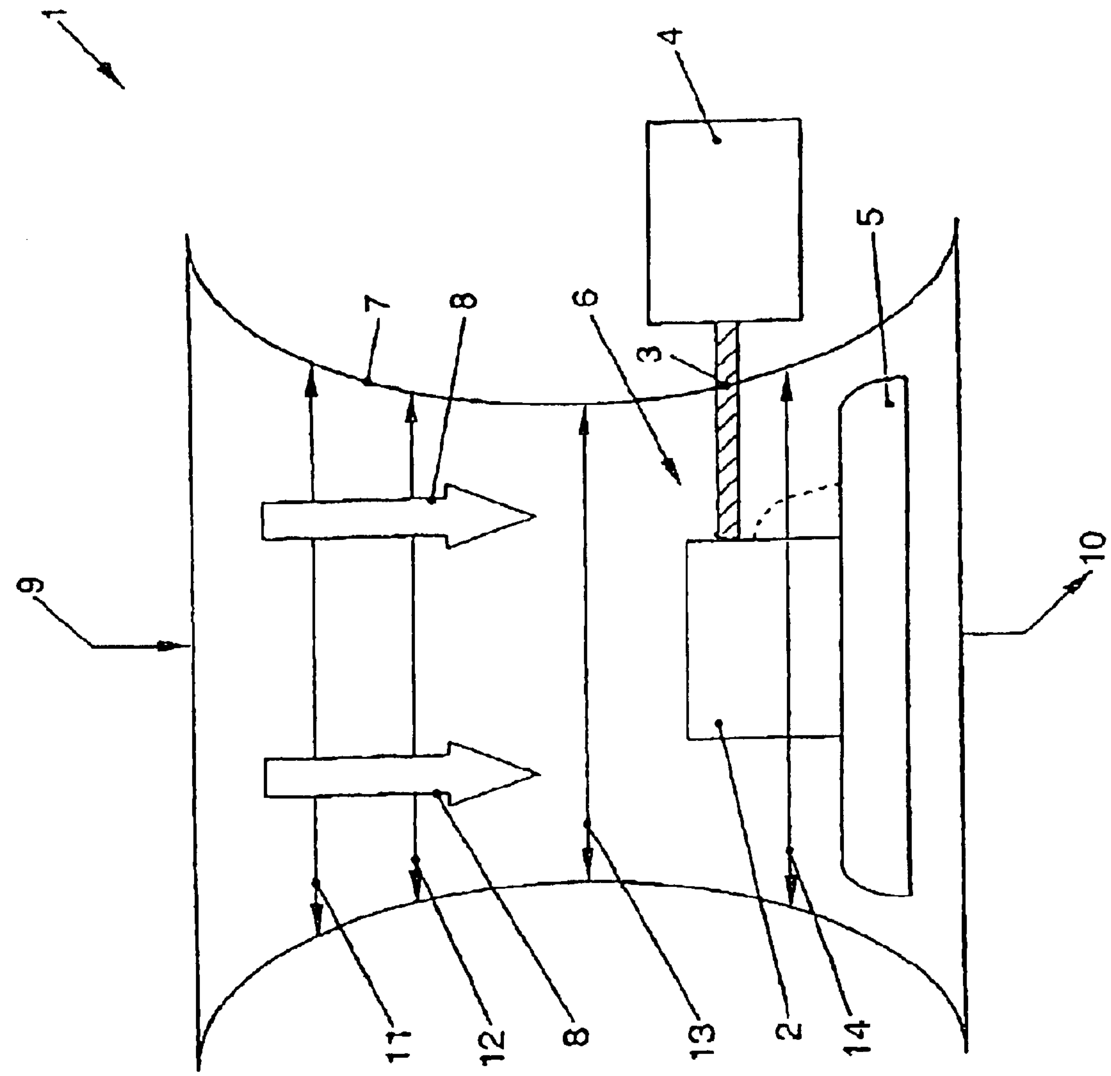
1
4
5
7
8
6
3
9
10
11
12
8
13
2
14

DEVICE FOR PROCESSING A WORKPIECE

This application is a continuation of U.S. Ser. No. 10/245,969 filed on Sep. 18, 2002, now abandoned.

FIELD OF THE INVENTION

The present invention relates to a device for processing a workpiece using a machining center, situated in a working space, in which the workpiece is processed using a tool, the working space being constructed to have a gas stream able to flow through for removing processing residues, and being equipped with a first cross sectional area and a second cross sectional area that is smaller than the first cross sectional area, and is positioned behind the first cross sectional area in the flow direction.

BACKGROUND INFORMATION

A device of the type named is referred to in German Published Patent Application No. 44 39 114. A machine tool for dry machining of a workpiece has a sectional chamber, in which the workpiece is processed, that is separated by a metal partition. Cuttings that are created are removed from the chamber by supplying gas to this chamber or by exhausting gas from the chamber. The metal partition is tapered in the downward direction, so that the pressure gradient in the sectional chamber is influenced in such a way that an orderly removal of cuttings may occur through the evacuation opening situated in this region. However, cuttings which come about by the metal removal in the region workpiece/tool are not picked up by this flow.

German Published Patent Application No. 197 34 631 A1 refers to a device for cleaning processing residues by using cleaning air. A workpiece to be cleaned is introduced into a working space that becomes narrower as it goes, a suction air stream flowing through the working space, whose flow speed increases within the working space, sucking off the contaminations from the workpiece. For the removal of coarse, heavy cuttings, an extreme narrowing of the working space or a generously dimensioned evacuation device would be necessary. The processing residues created by processing workpieces are not able to be removed by this air stream since the processing takes place in another machine or in a separate housing chamber, which calls for a considerable requirement for different machines.

In German Published Patent Application No. 197 34 628, a method is referred to for removing processing residues in which the machining center of a workpiece is crossed by a directionally guided suction air stream in a tightly sealed encapsulated working space. The working space includes the entire machine tool and is therefore of a considerable size. In order to be able to remove the processing residues in an orderly fashion, it is necessary to have a corresponding suction power, and, connected with that, generously dimensioned exhaust equipment. German Published Patent Application No. 40 02 568 A1 also refers to a method for removing processing residues from a processing space. The processing residues are blown out of a settling region and towards a suction air stream. In the settling region, an exactly to be defined suction air stream is formed by a partial vacuum in the working space. This method is very costly, since a working space, in which the processing machine itself is situated, has to be evacuated.

A further device for sucking off processing residues is referred to in German Published Patent Application No. 196 51 662. To efficiently keep the processing region free from processing residues, the sucked-off air is guided towards a nozzle situated in the processing region by the sucking accessory via a feedback line This device is very costly German Published Patent Application No. 42 18 247 refers to a device in which a removed material trap housing for cuttings created by the processing is fastened directly to the tool or the spindle. In this case, however, not all the cuttings created are trapped. Besides, different trap housings are required for different tools.

In European Patent Specification No. 51 06 37 and PCT International Patent Application No. WO 93/16 334, a working space is referred to in which an air curtain is created in front of a working space opening by a circulating air stream, and this prevents the inflow of environmental air into the working space. The method does not mention whether or how processing residues are removed.

SUMMARY OF THE INVENTION

An object of an exemplary embodiment of the present invention is to provide a device, of the type mentioned at the beginning, by which the removal of processing residues from the working space is substantially improved, without the need to increase the performance of the equipment creating the gas stream.

Thus, according to the exemplary embodiment of the present invention, a device for processing a workpiece is provided in which the working space (or enclosure) has, in the direction of flow of the gas stream, a third cross sectional area positioned behind the second cross sectional area and enlarged with respect to it, and the machining center is situated behind a narrowest cross sectional area of the working space. On account of the design of the working space in the form of a Laval nozzle, the gas flow inside the working space is at first continuously accelerated, specifically until shortly after the narrowest cross section. The maximum speed of the gas flow occurs at that point. In this region the machining center is situated. The processing residues created here, for example the workpiece particles or liquid cooling lubricants, are exposed to the greatest flow speed of the gas stream, so that a greater kinetic energy, compared to that at the inflow speed, may be transmitted to the processing residues. Thereby the removal of the processing residues is made substantially simpler and better. The flow speed of the gas stream is influenced positively, without change in the performance of the equipment generating the gas stream. Since the machining center is positioned in the region where the working space becomes larger again, there is sufficient space for the workpiece and further parts of the device, such as, for instance, a supporting table. The gas stream guided into the working space for removing the processing residues may additionally be used for cooling the tool and/or the workpiece.

Another exemplary embodiment of the present invention is provided by supplying the working space with a arrangement that acts to rotate the gas stream about its flow axis. This puts a spin on the gas stream. Under the influence of the appearing centrifugal forces, the processing residues are removed radially outwards, away from the machining location.

In another exemplary embodiment, the arrangement has a flow-directing element. In this context, the flow-directing element is fixed in the region of an edge section of the working space.

In another exemplary embodiment, the working space has a working space wall having a design which sets the gas stream into rotation about its flow axis, in order to further optimize removal of the processing residues in this manner.

This may involve, for instance, spirally shaped grooves in the working space wall. This design is produced in one piece with the working space wall. No additional components have to be positioned in the working space or fastened to the working space wall.

In another exemplary embodiment, the working space has a supply device or a removal device for supplying or removing a gas, the gas being at least partially able to be supplied to or removed from the working space in a tangential manner, and thereby the gas stream may be moved into rotation about its axis of flow. In this case, the flow speed of the gas stream is not lowered by conducting elements or designs in the working space wall.

In addition, in an exemplary embodiment a filtering element may be assigned to the supply device or the removal device. Thereby penetration of undesired environmental influences, such as dust particles, together with the gas stream is effectively avoided. The processing residues may be trapped and appropriately disposed of in the region of the removal device.

In this connection, in an exemplary device according to the present invention, the working space is essentially formed comparably to a Laval nozzle. Thereby, in the regions of different cross sectional areas, exactly predeterminable flow conditions prevail which are usable in optimal fashion for the processing of the workpiece.

In connection to this, according to another exemplary embodiment of the present invention, the position of the machining center in the working space may be set. In this case, the position may be made to follow, for example, the progressive processing of the workpiece, so that the region of the application of the tool is held constantly in the region of the greatest flow speed.

In another exemplary embodiment, the working space is designed or arranged to be at least sectionally transparent, so as to make possible to the operator a visual control of the machining process.

BRIEF DESCRIPTION OF THE DRAWING

The FIGURE shows a device for processing a workpiece with a tool which is driven by a spindle.

DETAILED DESCRIPTION

The FIGURE shows a device 1 for processing a workpiece 2 with a tool 3 which is driven by a spindle 4. Device 1 is furnished with a machining table 5, on which workpiece 2 is situated. The processing of workpiece 2 with tool 3 takes place in a machining center 6 which is a portion of working space 7. A gas stream 8, shown in the drawing by an arrow, removes the processing residues created during the processing of a workpiece 2, such as cuttings or powders, from working space 7.

Gas stream 8 may be generated by a blower (not shown) or by exhaust equipment (not shown), which are connected to working space 7 via a supply device 9 or an exhaust device 10. Working space 7 is designed similar to a Laval nozzle. As seen in the direction of flow, working space 7 first of all becomes narrower from a first cross sectional area 11 via a second cross sectional area 12 to the narrowest cross sectional area 13, and after that it becomes wider again to a third cross sectional area 14. As a result of this design of working space 7, gas stream 8 introduced by supply device 9 is first continuously accelerated until shortly after narrowest cross sectional area 13, after which the maximum flow speed of gas stream 8 is reached. In the further course, the cross sectional area of working space 7 becomes larger and the flow speed becomes smaller. In this context, machining center 6 is positioned in the region of the greatest flow speed. The processing residues created in machining center 6 are thus exposed to the greatest flow speed of gas stream 8, so that the removal of processing residues may be substantially improved, without a change in the supplied or exhausted gas stream 8. In addition, in this region the cross sectional area of the working space is widened, so that sufficient available space for the placement of the machining table and the tool is present.

The FIGURE shows a device 1, a workpiece 2, a tool 3, a spindle 4, a machining table 5, a machining center 6, a working space 7, a gas stream 8, supply equipment 9, exhaust equipment 10, a first cross sectional area 11, a second cross sectional area 12, a narrowest cross sectional area 13, and a third cross sectional area 14.

What is claimed is:

1. A device for use in processing a workpiece, comprising:

a working space arrangement for use with a machining center situated in the working space arrangement and a tool to aid in processing the workpiece;

wherein:

a gas stream is flowable through the working space arrangement to remove operating residues from processing the workpiece;

the working space arrangement includes working space walls having a first cross sectional area and a second cross sectional area that is arranged smaller than the first cross sectional area and is situated downstream of the first cross sectional area in a direction of flow of the gas stream, and the working space walls include a third cross sectional area in the direction of flow of the gas stream, situated downstream of the second cross sectional area in the direction of flow of the gas stream and enlarged compared to the second cross sectional area; and the machining center is situated within the working space walls downstream of a narrowest cross sectional area of the working space walls in the direction of flow of the gas stream between the first cross sectional area and the third cross sectional area.

2. The device of claim 1, wherein the working space arrangement is provided with a rotating arrangement to rotate the gas stream about its axis of flow.

3. The device of claim 2, wherein the rotating arrangement includes a flow-conducting element.

4. The device of claim 1, wherein the working space walls are configured to set the gas stream into rotation about its axis of flow.

5. The device of claim 1, wherein the working space arrangement includes supply equipment for supplying a gas or exhaust equipment for exhausting the gas, the gas being one of at least partially suppliable to and exhaustible from the working space tangentially, so that the gas stream is able to be set into rotation about its axis of flow.

6. The device of claim 5, wherein the one of the supply equipment and the exhaust equipment includes a filtering element assigned to it.

7. The device of claim 5, wherein the supply equipment or the exhaust equipment includes a filter.

8. The device of claim 1, wherein the working space arrangement is formed essentially in a comparable way to a Laval nozzle.

9. The device of claim 1, wherein the position of the machining center in the working space arrangement is adjustable.

10. The device of claim 1, wherein the working space arrangement is at least sectionally transparent.

11. The device of claim 1, wherein the working space walls include spirally shaped grooves.

12. The device of claim 1, wherein the direction of flow of the gas stream is arranged substantially in a longitudinal direction of the working space walls.

13. The device of claim 1, wherein the cross sectional areas are configured to increase a flow speed of the gas stream between the first cross sectional area and the second cross sectional area.

14. The device of claim 1, wherein the machining center is positioned in the gas stream in a region of greatest flow speed of the gas stream.

15. The device of claim 1, wherein the cross sectional areas are arranged as a Laval nozzle.

* * * * *

UNITED STATES PATENT AND TRADEMARK OFFICE

CERTIFICATE OF CORRECTION

PATENT NO. : 6,821,062 B2
DATED : November 23, 2004
INVENTOR(S) : Hockauf et al.

It is certified that error appears in the above-identified patent and that said Letters Patent is hereby corrected as shown below:

Column 2,
Line 2, change "a feedback line  This device" to -- a feedback line. This device --

Column 4,
Line 29, change "is arranged smaller than" to -- is smaller than --

Signed and Sealed this

Twelfth Day of July, 2005

JON W. DUDAS
*Director of the United States Patent and Trademark Office*